E. CHIPMAN.
Churn.
No. 46,880.
Patented March 21, 1865.
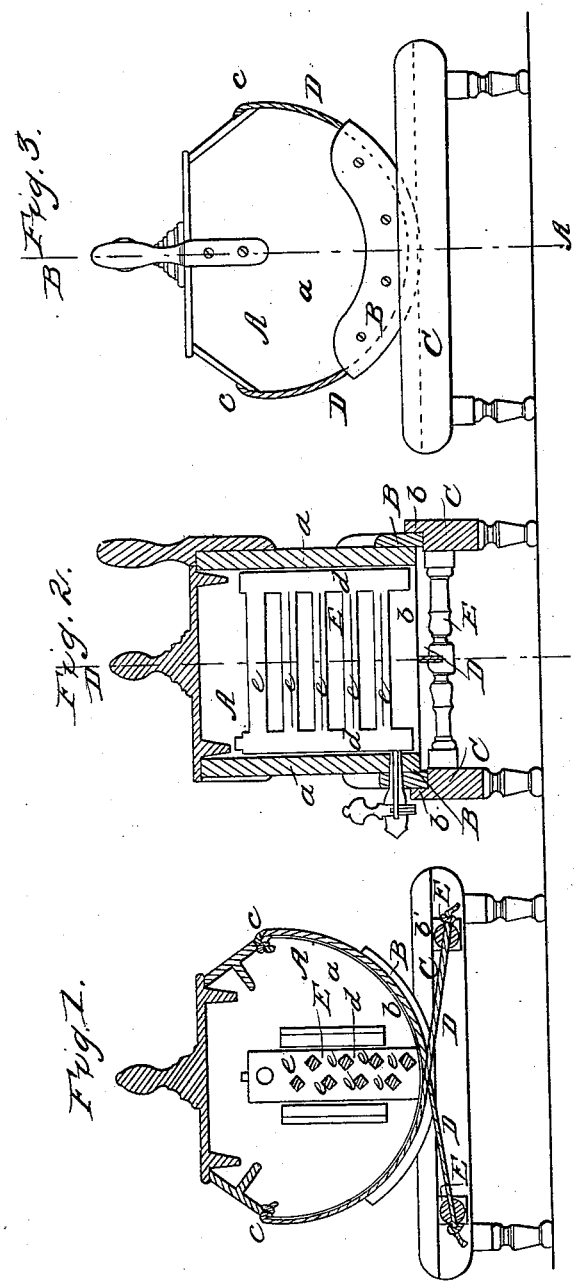
Witnesses:
J. P. Hall
Wm. F. McNamara
Inventor:
Edgar Chipman

UNITED STATES PATENT OFFICE.

EDGAR CHIPMAN, OF NEW YORK, N. Y.

IMPROVEMENT IN CHURNS.

Specification forming part of Letters Patent No. 46,880, dated March 21, 1865.

*To all whom it may concern:*

Be it known that I, EDGAR CHIPMAN, of the city, county, and State of New York, have invented a new and Improved Churn; and I do hereby declare that the following is a full, clear, and exact description thereof, which will enable others skilled in the art to make and use the same, reference being had to the accompanying drawings, making a part of this specification, in which—

Figure 1 represents a side sectional view of my invention, taken in the line C D, Fig. 2; Fig. 2, a transverse vertical section of the same, taken in the line A B, Fig. 3; Fig. 3, a side view of the same.

Similar letters of reference indicate like parts.

This invention relates to certain new and useful improvements on a churn for which Letters Patent were granted to me, bearing date January 12, 1864.

The invention relates to a means employed for keeping the churn in proper position on the ways on which it oscillates or rocks, and also in an improved means for keeping the cream at a proper temperature most favorable for the production of butter.

A represents the body of the churn, formed with vertical sides $a$ $a$, and a semicircular bottom, $b$, which may be of zinc. To the lower end of each side $a$ $a$ there is attached a rocker, B, and these rockers project a short distance below the sides $a$ $a$, and rest upon parallel ways or guides C C, each of which is provided with an upright ledge or cleat, $b'$, which serve as guards for the rockers and prevent the same from shifting laterally on the ways or guides, as will be seen by referring to Fig. 2.

D D represent two cords or chains which are attached at one end to cross-bars E E, at the ends of the ways or guides C C, the opposite ends being attached to the ends of the churn A, as shown at $c$ $c$, Figs. 1 and 3, the cords or chains crossing each other, as shown in Fig. 1.

From the above description it will be seen that the churn cannot move laterally on the ways or guides C C, while the cords or chains D D prevent the churn from slipping longitudinally on the ways or guides C C—a contingency quite likely to occur if the ways or guides are slightly inclined.

The means above described for keeping the churn while in use in the proper position on the ways or guides adds greatly to the value of the device and prevents much trouble and embarrassment hitherto attending its use.

The churn is rocked or oscillated on the ways or guides C C by hand or other power.

Within the body A of the churn there is placed vertically or centrally a stationary dasher, E, which may be constructed of two upright tubes, $d$ $d$, connected by horizontal tubes $e$. These tubes are all hollow, the horizontal ones communicating with the upright ones.

The horizontal tubes $e$ are placed at such a distance apart as to admit of the cream passing between them as the churn is rocked or oscillated, and at the same time afford a resistance to the cream sufficient to cause a requisite degree of agitation to produce the butter quickly.

The hollow dasher, in case the temperature of the cream is too high, is filled with cold water, in order to reduce the temperature of the cream, and if the temperature of the latter be too low it may be raised by filling the dasher with warm water. Thus, by this simple means, the cream may be kept at a temperature most favorable for the production of butter.

I do not confine myself to any particular form of dasher E, for various forms may be used and the same end attained if the dasher be tubular or hollow.

Having thus described my invention, I claim as new and desire to secure by Letters Patent—

1. The rockers B, in combination with the ledges or cleats $b'$ on the ways or guides C C, to prevent any lateral movement of the churn on the ways or guides, as set forth.

2. The cords or chains D D, applied to the churn, and the cross-bar E of the ways or guides, to prevent longitudinal slipping of the churn on the ways or guides, as specified.

3. The tubular fixed dasher E, when used in connection with a rocking or oscillating churn, substantially as and for the purpose specified.

EDGAR CHIPMAN.

Witnesses:
WM. T. MCNAMARA,
J. P. HALL.